Oct. 15, 1963    R. FAGEL    3,107,304
PLURAL MOTOR DRIVE WITH MOTOR FIELD CONTROL FOR A VEHICLE
Filed Nov. 21, 1960
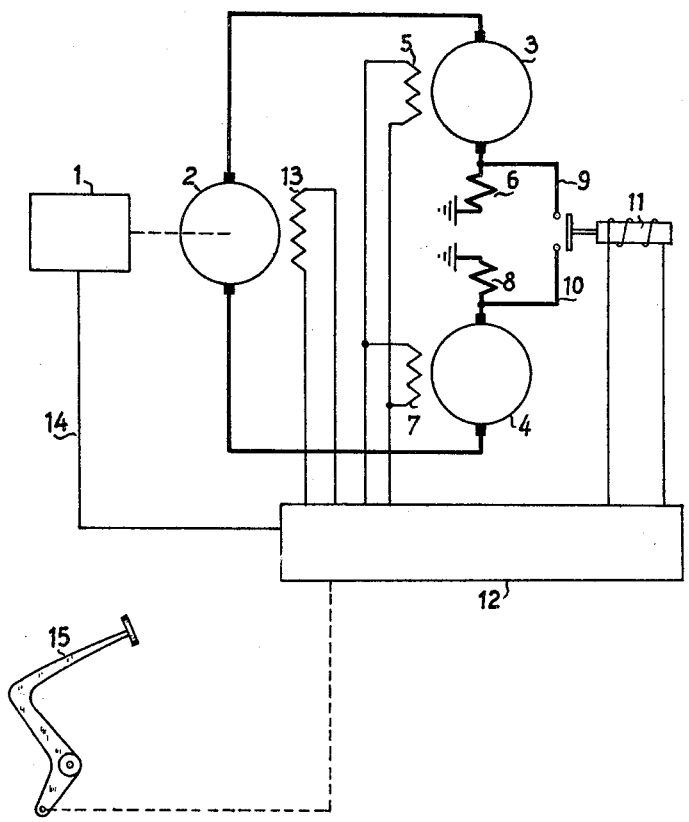
INVENTOR
Roger FAGEL
BY
ATTORNEYS

United States Patent Office

3,107,304
Patented Oct. 15, 1963

3,107,304
PLURAL MOTOR DRIVE WITH MOTOR FIELD CONTROL FOR A VEHICLE
Roger Fagel, Marcinelle, Belgium, assignor to Ateliers de Constructions Electriques de Charleroi, Brussels, Belgium
Filed Nov. 21, 1960, Ser. No. 70,851
Claims priority, application France Nov. 23, 1959
4 Claims. (Cl. 290—17)

The invention relates to vehicles driven by groups comprising electric motors supplied with current by a generator driven by an internal combustion engine and wherein the electric motors are disposed in the vehicle wheels. In such a case, it is of great importance to ensure very small bulk, not only of the motors themselves, but also of all the elements fixed thereon. The current supply leads of the direct-current motors to be used in such an application will have to carry very heavy currents and should be of large sectional area, so that the number of conductors necessary to supply the current to the electric motors should be reduced to a minimum.

It is an object of the invention to provide motors of very little weight and diameter in order to locate them in the wheels of a vehicle. Another object of the invention is the provision of simple, appropriate means for switching from forward running to rearward running of a vehicle driven by electric motors.

According to the invention, this result is obtained due to the fact that each electric motor is provided with an independent field winding and a series field winding, one end of the series winding of each motor being connected to the body of the motor, while the other end of the series winding, connected to the commutator brush or brushes, is connected to a contactor by which the series windings can be short-circuited.

The series field windings are preferably short-circuited during reverse running of the vehicle.

The invention is hereinafter described with reference to an example of embodiment, the electrical circuit diagram of which is represented in the accompanying drawing.

According to the invention, the vehicle is driven by a group comprising an internal combustion engine 1 driving an electric generator 2 which feeds two direct-current electric motors 3 and 4. The electric motors 3 and 4 are connected in series and arranged within the driving wheels of the vehicle (not shown).

One motor 3 comprises an independent field winding 5 and a series field winding 6. The other motor 4 comprises an independent field winding 7 and a series field winding 8.

The field windings 6 and 8 are connected respectively at one end to the bodies of the motors 3 and 4, represented by the earth symbol, and at the other end through the conductors 9 and 10 to the contacts of a contactor 11 actuated by a control device 12. This control device 12 also feeds the field windings 5 and 7 of the motors 3 and 4, and the field winding 13 of the generator 2. The line 14 connecting the device 12 to the internal combustion engine 1 symbolizes the fact that the device 12 is not only actuated by the driver of the vehicle, as by the pedal 15, but also transmits and cancels orders to the internal combustion engine 1. During forward running of the vehicle, the contactor 11 is open and the motor fields are energised through their series windings, which permits of varying the speed as a function of the torque exerted by the wheels and thus possesses the necessary flexibility for the driving of a vehicle. For reverse running, the independent field current is reversed as usual, whereas the series field windings are not changed over but are short circuited by the closing of the contactor 11.

Due to this fact, the motors 3 and 4 require only two main conductors (instead of four), and for reverse running the motors are excited exclusively by the independent field windings 5 and 7. Such a control is suitable for vehicles designed mainly for forward running, reverse drive being provided only in order to satisfy the needs of maneuvering and traffic conditions.

What is claimed is:

1. In a wheeled vehicle an electrical generator having an armature and an independent field winding, an internal combustion engine drivingly connected to said generator, electric motors disposed in the vehicle wheels, each motor having an armature, a series field winding and an independent field winding, an electric cable leading from one side of the generator armature to one side of a motor armature, an electric cable leading from the other side of the generator armature to one side of another motor armature, electrical connections from the other side of the armature of each of said motors to one side of its associated series field winding, electrical connections from each of said connections and connected respectively to a pair of stationary contacts of a contactor, a movable contact for said contactor adapted to bridge said stationary contacts when said contactor is energised, electrical connections from the other side of each of said series field windings to ground, control means for said internal combustion engine, said generator, said motors and said contactor, electric cables leading from said independent field windings to said control means, electric cables leading from said contactor to said control means, said control means feeding current in one direction to all said independent field windings for forward running, said control means feeding current in said one direction to said generator independent field winding and in a reverse direction to said motor independent field windings for reverse running and also feeding current to said contactor whereby said motor series windings are short-circuited.

2. In a wheeled vehicle a direct current electrical generator having an armature with commutator and brushes and an independent field winding, an internal combustion engine drivingly connected to said generator, a pair of direct current electric motors disposed in wheels of the vehicle in driving relation thereto, each motor having an armature with commutator and brushes, a series field winding and an independent field winding, a pair of electric cables leading from the generator brushes to one brush of each motor, respectively, an electrical connection from the other brush of each motor to one end of its associated series field winding, electrical connections from each of said connections and connected respectively to a pair of stationary contacts of a contactor, a movable contact for said contactor adapted to bridge said stationary contacts when said contactor is energised, electrical connections from the other end of each of said series field windings to frame, a control device for said generator, motors and contactor, electric cables leading from each of said independent field windings and from said contactor to said control device, said control device being adapted to feed electric current to said independent field windings in a direction to assist said series windings during forward running of the vehicle, said control device being adapted, for reverse running, to feed current in said direction to the generator independent field winding and in a reverse direction to said motor independent field windings and also to feed current to said contactor whereby said motor series windings are short-circuited and rendered ineffective.

3. In a wheeled vehicle, an electric generator having an armature; an internal combustion engine drivingly connected to said generator and electric motors having bodies fixed in the vehicle wheels; said bodies being connected one with the other in electrical conductive manner; each motor having an armature, an independent field winding and a series field winding; one side of the armature of each motor being connected to said generator; the other side of the armature of each motor being connected to both a normally open contact of a contactor and to one side of its series winding; the other side of the series winding of each motor being connected to its body; said contactor being arranged to short-circuit said series windings of said motors when it is closed.

4. In a wheeled vehicle, an electric generator having an armature; an independent field winding; an internal combustion engine drivingly connected to said generator and electric motors having bodies fixed in the vehicle wheels; said bodies being connected one with the other in electrical conductive manner; each motor having an armature; a series field winding and an independent field winding; one side of the armature of each motor being connected to said generator; the other side of the armature of each motor being connected to both a normally open contact of a contactor and to one side of its series winding; the other side of the series winding of each motor being connected to its body; said contactor being arranged to short-circuit said series windings of said motors; when it is closed, said independent field windings of the generator and of the motors being connected to an operating device; said operating device comprising means to actuate said contactor in order to short-circuit said series winding when current direction in the independent field windings of the motors is reversed, whereby the direction of rotation is reversed.

References Cited in the file of this patent
UNITED STATES PATENTS

| 1,070,647 | Whittingham | Aug. 19, 1913 |
| 2,443,459 | Johnson | June 15, 1948 |

FOREIGN PATENTS

| 730,950 | Germany | Feb. 1, 1943 |